(12) United States Patent
Hosaka et al.

(10) Patent No.: US 10,378,180 B2
(45) Date of Patent: Aug. 13, 2019

(54) WORKING MACHINE WITH ANGLE DETECTION DEVICE

(71) Applicant: KOBELCO CONSTRUCTION MACHINERY CO., LTD., Hiroshima-shi (JP)

(72) Inventors: Yoshinobu Hosaka, Hiroshima (JP); Nobuhiro Koga, Hiroshima (JP); Takanobu Nakamura, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 329 days.

(21) Appl. No.: 15/452,304

(22) Filed: Mar. 7, 2017

(65) Prior Publication Data
US 2017/0306587 A1 Oct. 26, 2017

(30) Foreign Application Priority Data
Apr. 21, 2016 (JP) ................................ 2016-085104

(51) Int. Cl.
*E02F 9/00* (2006.01)
*E02F 9/26* (2006.01)
(Continued)

(52) U.S. Cl.
CPC .............. *E02F 9/006* (2013.01); *E02F 3/965* (2013.01); *E02F 9/0858* (2013.01);
(Continued)

(58) Field of Classification Search
CPC ..... G01D 5/34738; G01D 11/02; E02F 3/845; E02F 3/907; E02F 9/264; E02F 9/265
See application file for complete search history.

(56) References Cited

U.S. PATENT DOCUMENTS

2013/0099107 A1* 4/2013 Omoto ................ F16C 41/007
250/231.13
2013/0255089 A1 10/2013 Brosz et al.

FOREIGN PATENT DOCUMENTS

EP 2 645 069 A2 10/2013
FR 2 904 671 A1 * 2/2008
(Continued)

OTHER PUBLICATIONS

Extended European Search Report dated Sep. 7, 2017 in Patent Application No. 17159186.0.
(Continued)

*Primary Examiner* — Gerald McClain
(74) *Attorney, Agent, or Firm* — Oblon, McClelland, Maier & Neustadt, L.L.P.

(57) ABSTRACT

Provided is a working machine including first and second members, an angle detection device and a connection pin connected to the first and second members to rotate integrally with the second member relative to the first member. The angle detection device has a marker, an angle sensor and a guard member, which has a main guard portion covering the angle sensor and including an inner opposite surface opposed to an end surface of the projecting end portion and a guard-member-side engagement portion. One of the angle sensor and the marker is disposed on the inner opposite surface, the other disposed on the end surface. The first member has a first-member-side engagement portion engaging with the guard-member-side engagement portion to restrain the main guard portion from relative rotation. The guard member can contact with the connection pin to restrain the guard member from relative displacement to the projecting end portion.

8 Claims, 10 Drawing Sheets

(51) Int. Cl.

| | | |
|---|---|---|
| *E02F 9/08* | (2006.01) | |
| *E02F 9/20* | (2006.01) | |
| *E02F 3/96* | (2006.01) | |
| *E02F 9/22* | (2006.01) | |
| *F16C 41/00* | (2006.01) | |
| *G01D 5/244* | (2006.01) | |
| *G01D 11/24* | (2006.01) | |
| *E02F 9/24* | (2006.01) | |
| *G01B 5/24* | (2006.01) | |
| *G01B 7/30* | (2006.01) | |
| *G01D 5/14* | (2006.01) | |
| *F16C 11/04* | (2006.01) | |

(52) U.S. Cl.
CPC .............. *E02F 9/2033* (2013.01); *E02F 9/22* (2013.01); *E02F 9/26* (2013.01); *E02F 9/264* (2013.01); *F16C 41/007* (2013.01); *G01D 5/24433* (2013.01); *G01D 11/24* (2013.01); *E02F 9/24* (2013.01); *F16C 11/045* (2013.01); *F16C 2350/26* (2013.01); *G01B 5/24* (2013.01); *G01B 7/30* (2013.01); *G01D 5/145* (2013.01)

(56) References Cited

FOREIGN PATENT DOCUMENTS

| | | | |
|---|---|---|---|
| JP | 59-7201 A | | 1/1984 |
| JP | 3-106406 U | * | 11/1991 |
| JP | 3-106406 U | | 11/1991 |
| JP | 6-49938 U | | 7/1994 |
| JP | 2017-082398 A | * | 5/2017 |
| JP | 2017-083184 A | * | 5/2017 |

OTHER PUBLICATIONS

Japanese Office Action dated Mar. 6, 2018 in Japanese Patent Application No. 2016-085104 (with English translation), 4 pages.

* cited by examiner

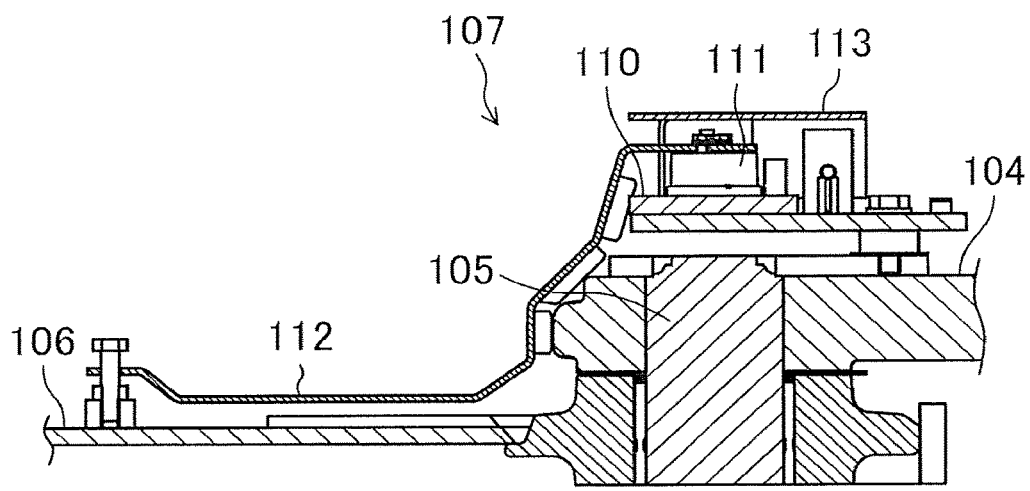

WORKING MACHINE WITH ANGLE DETECTION DEVICE

TECHNICAL FIELD

The present invention relates to a working machine including a first member and a second member which are rotatably coupled to each other, and an angle detection device which detects an angle that the second member makes with the first member.

BACKGROUND ART

There is conventionally known a working machine equipped with a working device including two members rotatably coupled to each other such as a hydraulic excavator and a crusher, wherein the working device is further provided with an angle sensor for detecting an angle between the two members (e.g. JP H06-049938 U).

FIG. 9 and FIG. 10 show one example of a working machine of such a type. The working machine includes a first member 104, a second member 106 rotatably attached to the first member 104 through a joint pin 105, a housing body 110 fixed to the first member 104, an angle detection device 107 including an angle sensor 111 which is fixed to the housing body 110 and has a detection shaft, and a lever 112 which interconnects the detection shaft and an external surface portion of the second member 106. The angle sensor 111 detects a relative angle that the second member 106 makes with the first member 104. The angle detection device 107 further includes a cover member 113, which is arranged, as indicated by hatching in FIG. 9, so as to guard the angle sensor 111 axially thereof.

The cover member 113 is, however, not allowed to cover the angle sensor 111 at the side of the cover member 113 because of the necessity for avoiding interference between the lever 112 and the cover member 113 within a rotational range of the lever 112. This causes the angle sensor 111 to be likely to result in failure due to intrusion of a stone or the like.

In addition, the cover member 113 may be deformed by physical contact thereof with other member to bring a part of the deformed cover member 113 into contact with the angle sensor 111, which can involve damage of the angle sensor 111 or disable the angle sensor 111 from appropriate angle detection. Besides, damage of the lever 112 itself also disables the angle detection from being performed.

SUMMARY OF INVENTION

An object of the present invention is to provide a working machine including a first member, a second member coupled to the first member so as to be capable of rotational movement in a specific rotational-movement direction with respect to the first member, and an angle detection device including an angle sensor which detects a rotational-movement angle that the second member makes with the first member in the rotational-movement direction, the working machine being capable of reliably guarding the angle sensor without hindering the rotational movement.

To achieve the above object, the present inventors have conceived of providing a guard member which covers an angle sensor and letting a load applied to the guard member be transmitted to a connection pin for coupling a first member and a second member, the connection pin having high rigidity. Specifically, provided is a working machine including: a first member; a second member; a connection pin interposed between the first member and the second member, the connection pin interconnecting the first member and the second member so as to allow the second member to make rotational movement relative to the first member in a rotational-movement direction around the connection pin; and an angle detection device which detects a rotational-movement angle as an angle that the second member makes with the first member in the rotational-movement direction. The connection pin is connected to the second member so as to make rotational movement integrally with the second member while being connected to the first member so as to be able to make rotational movement relative to the first member in the rotational-movement direction, the connection pin having a projecting end portion which projects beyond the first member and the second member in an axial direction of the connection pin. The angle detection device includes a marker, an angle sensor which detects a relative angle position of the marker to the angle sensor in the rotational-movement direction, and a guard member which guards the angle sensor, the marker and the angle sensor being arranged so as to detect an angle that the connection pin makes with the first member in the rotational-movement direction. The guard member has a main guard portion, which covers the angle sensor so as to surround the projecting end portion of the connection pin all around the projecting end portion, and a guard-member-side engagement portion joined with the main guard portion. The main guard portion has an inner opposite surface which is an inner surface opposed to an end surface of the projecting end portion of the connection pin, one of the angle sensor and the marker being a first detection element disposed on the inner opposite surface, the other of the angle sensor and the marker being a second detection element disposed on the end surface of the projecting end portion so as to be opposed to the first detection element with a gap in the axial direction. The first member has a first-member-side engagement portion engageable with the guard-member-side engagement portion, and the first-member-side engagement portion and the guard-member-side engagement portion engage with each other to restrain the main guard portion from relative rotational movement to the first member in the rotational-movement direction. The guard member includes respective parts capable of making contact with an axial end surface and a circumferential surface of the projecting end portion of the connection pin, the contact causing the guard member to be restrained from relative displacement to the projecting end portion.

BRIEF DESCRIPTION OF DRAWINGS

FIG. 10 is an enlarged sectional view taken along line X-X in FIG. 9.

DESCRIPTION OF EMBODIMENTS

Below will be described an embodiment of the present invention with reference to the drawings.

Figure 2:
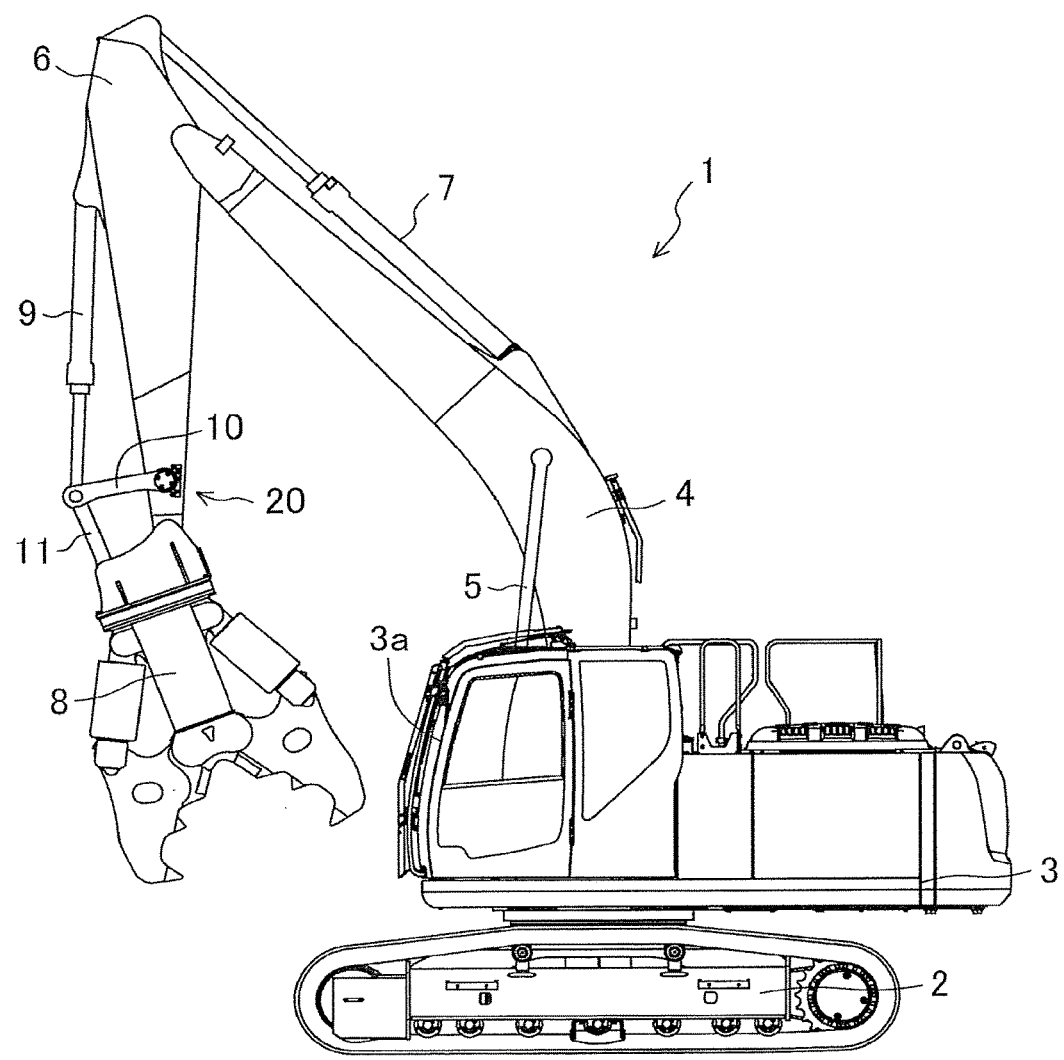
FIG. 2 is a side view showing the hydraulic excavator.

FIG. 2 shows a hydraulic excavator 1 as a working machine according to the embodiment of the present invention. The hydraulic excavator 1 includes a lower travelling body 2, an upper slewing body 3 capable of being slewed above the lower travelling body 2, and a working device. The upper slewing body 3 is provided with a driving room 3a on a front part thereof. The working device includes: a boom 4 supported by the upper slewing body 3 so as to be raised and lowered; a boom cylinder which extends and contracts so as to raise and lower the boom 4; an arm 6 rotatably connected to a distal end of the boom 4, the arm 6 being a first member; an arm cylinder 7 which extends and contracts so as to rotate the arm 6; a crushing device 8 as an end attachment which is rotatably attached to a distal end of the arm 6; an end attachment cylinder 9 which extends and contracts so as to rotate the crushing device 8; a pair of right and left idler links 10 as a second member rotatably coupled to a distal end portion of the end attachment cylinder 9 and the arm 6, respectively; a bucket link 11 rotatably coupled to the pair of right and left idler links 10 and the crushing device 8, respectively; and a pair of right and left connection pins 12. The end attachment is not limited to the crushing device 8, being permitted to be either of various kinds of buckets, a lifting magnet, a grapple and the like. The crushing device 8 is coupled to a part of the arm 6 which part is close to the distal end portion of the arm 6 through an arm side coupling pin 13 shown in FIG. 3, while being coupled to a distal-end-side end portion of the bucket link 11 through a link-side coupling pin 14 shown in FIG. 3.

Figure 4:
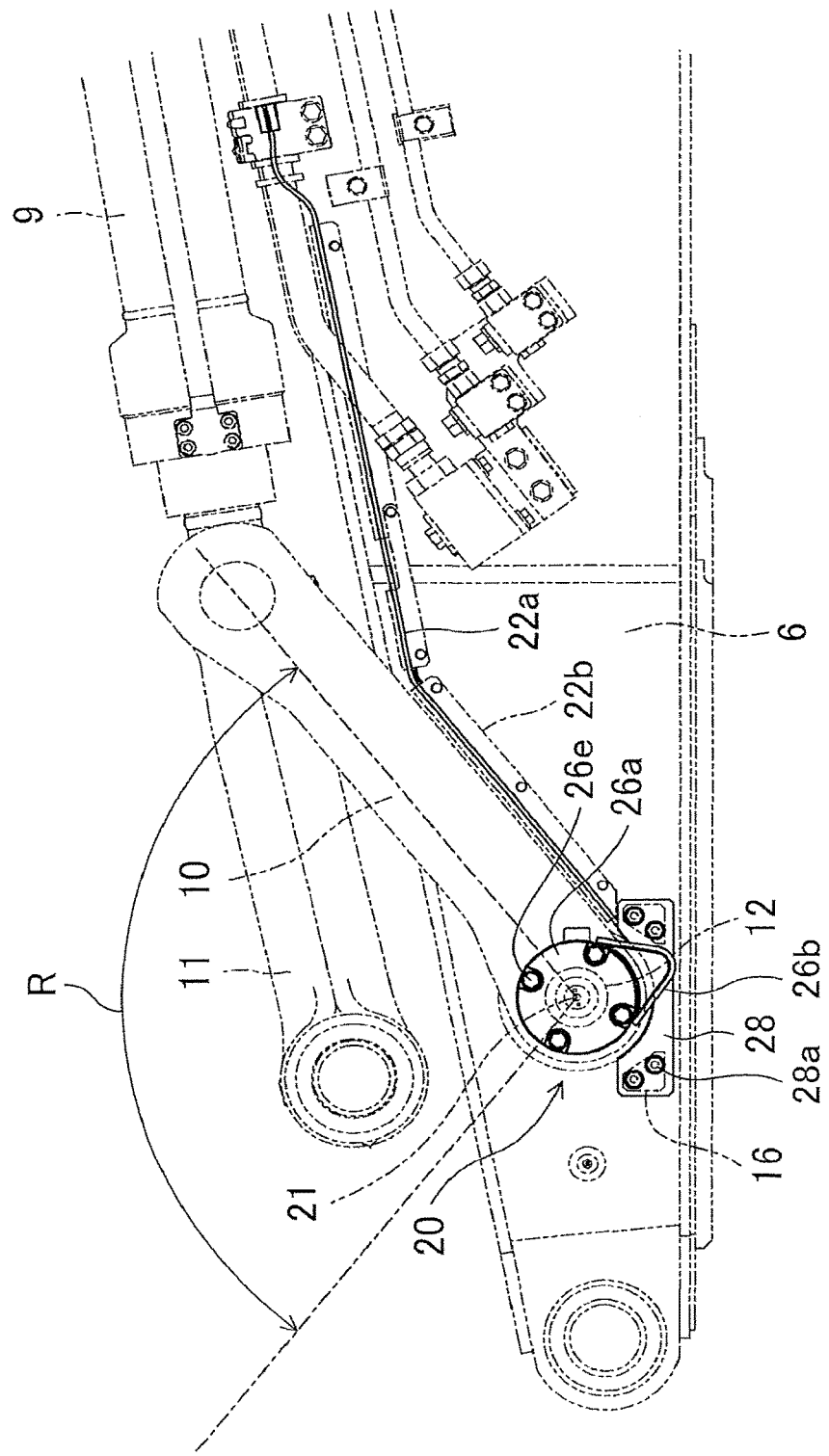
FIG. 4 is a side view showing the angle detection device.
Figure 5:
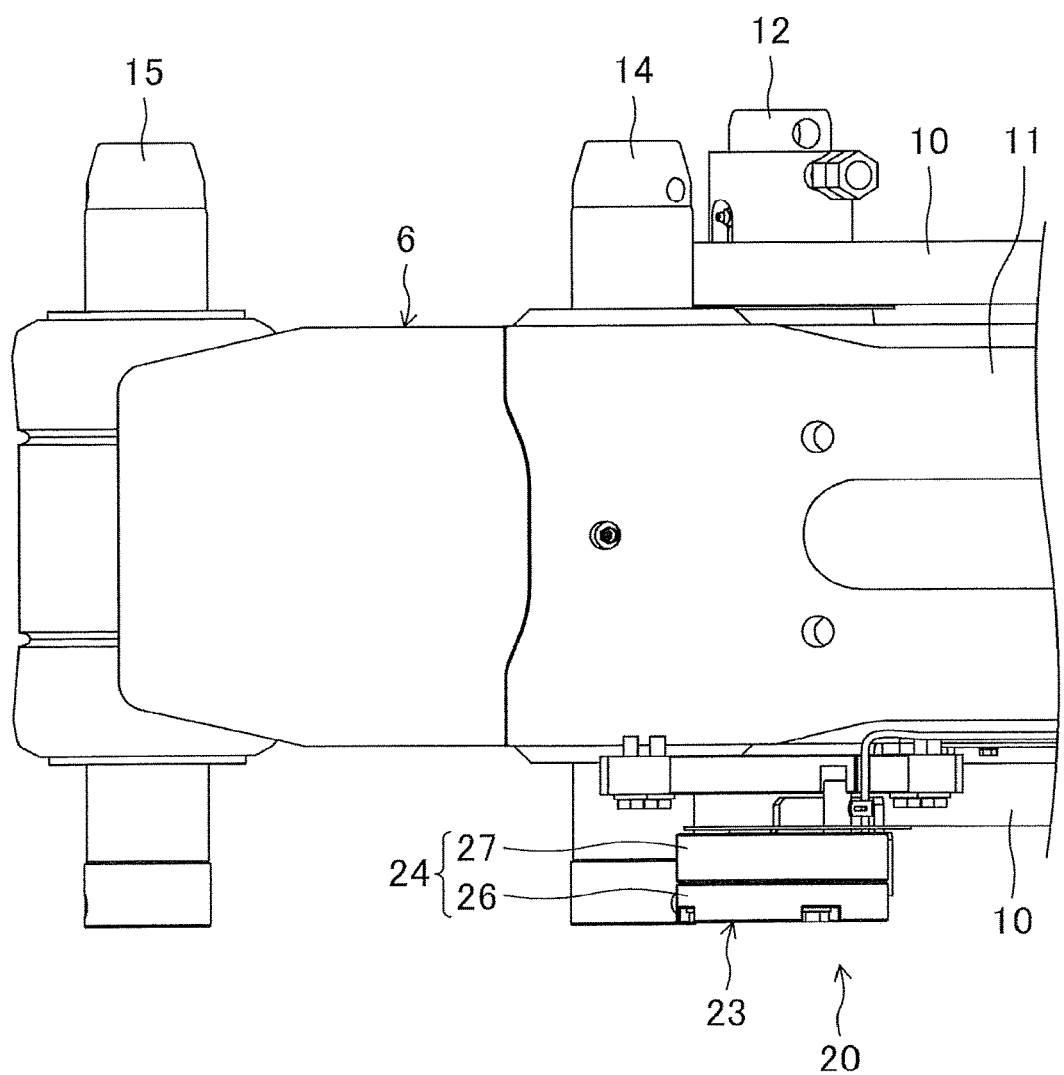
FIG. 5 is a plan view showing an enlargement of the angle detection device and the periphery thereof.

The pair of right and left idler links 10 has a proximal end portion and a distal end portion opposite thereto, the distal end portion being coupled to the distal end portion of the end attachment cylinder 9. The proximal end portion is connected to the arm 6 through the connection pin 12 so as to be able to make rotational movement in a rotational-movement direction around the connection pin 12. FIG. 4 shows a bidirectional arrow R which indicates a range of the rotational movement of the idler link 10 with respect to the arm 6. Each of the pair of right and left connection pins 12 according to the present embodiment has an inner end portion rotatably supported by the arm 6 and an outer end portion connected to the idler link 10 so as to make rotational movement integrally with the idler link 10, the outer end portion including a projecting end portion which projects outwardly beyond the arm 6 and the idler link 10. The projecting end portion has a flange portion 12b, which projects radially outwardly beyond other parts over the entire periphery.

Figure 1:
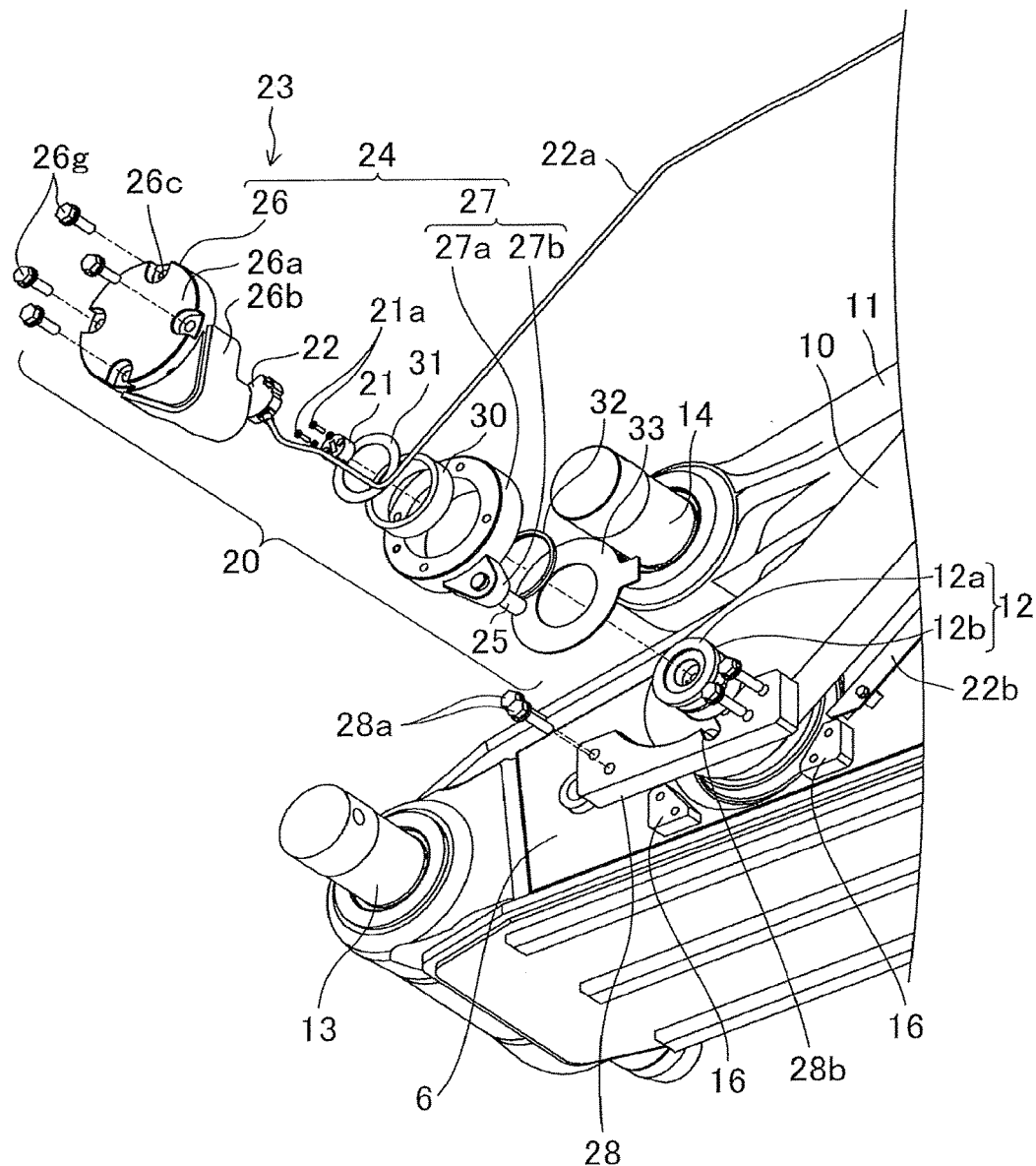
FIG. 1 is an exploded perspective view showing an enlargement of an angle detection device of a hydraulic excavator and periphery thereof according to an embodiment of the present invention.

The working machine according to the present embodiment further includes an angle detection device 20 which detects a rotational-movement angle that the idler link 10 makes with the arm 6 in the rotational-movement direction. As shown in FIG. 1, the angle detection device 20 includes a marker 21, an angle sensor 22, and a sensor mounting bracket 23 serving as a guard member for guarding the angle sensor 22.

Figure 7:
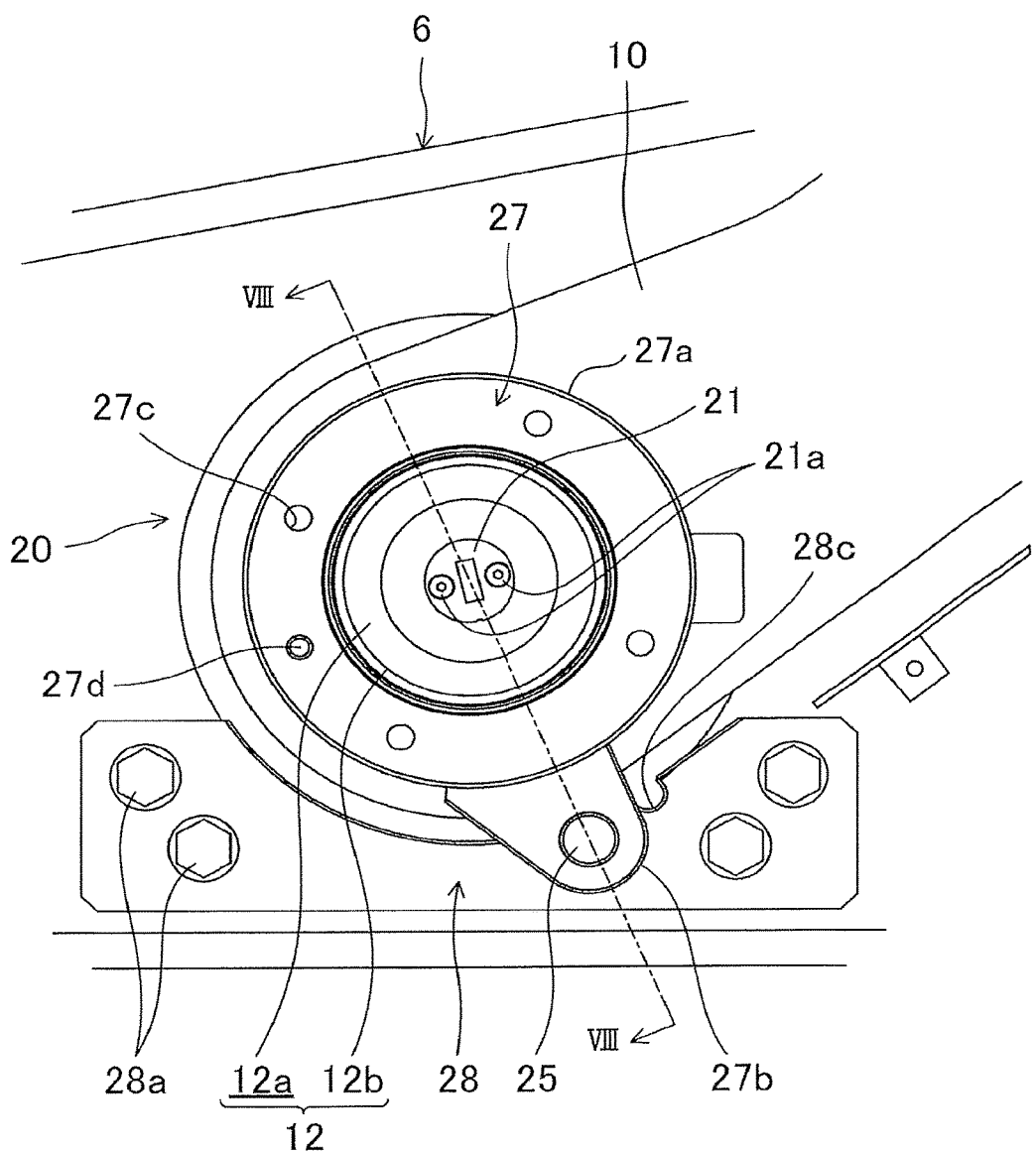
FIG. 7 is a side view showing an enlargement of the angle detection device and periphery thereof in a state where the cover portion side is removed.

The marker 21 is provided in the outer end portion of one connection pin of the pair of connection pins 12, the one connection pin being on the left side of the traveling direction. The marker 21 is, for example, a disc-shaped or column-shaped position marker, internally having a magnet. As shown in FIG. 7 and others, the marker 21 is fixed to the projecting end portion of the connection pin 12, for example, through a pair of screws 21a, so as to make rotational movement integrally with the connection pin 12.

The angle sensor 22 detects a relative rotational-movement position of the marker 21 with respect to the angle sensor 22 in the rotational-movement direction, namely, a rotational-movement angle. The angle sensor 22 is, for example, a magnetic non-contact rotary sensor which gets, through an integrated circuit, a direction of a magnetic field formed by the marker 21 and outputs the calculated angle as an analog signal. Misalignment and a distance between a main body of the angle sensor 22 and the marker 21 are required to be below the tolerance. The angle sensor 22 is disposed so as to be able to detect the rotational-movement angle of the idler link 10 relative to the arm 6 as described later, specifically, being attached to the sensor mounting bracket 23 restrained from relative rotational movement to the arm 6 as described later.

Figure 3:
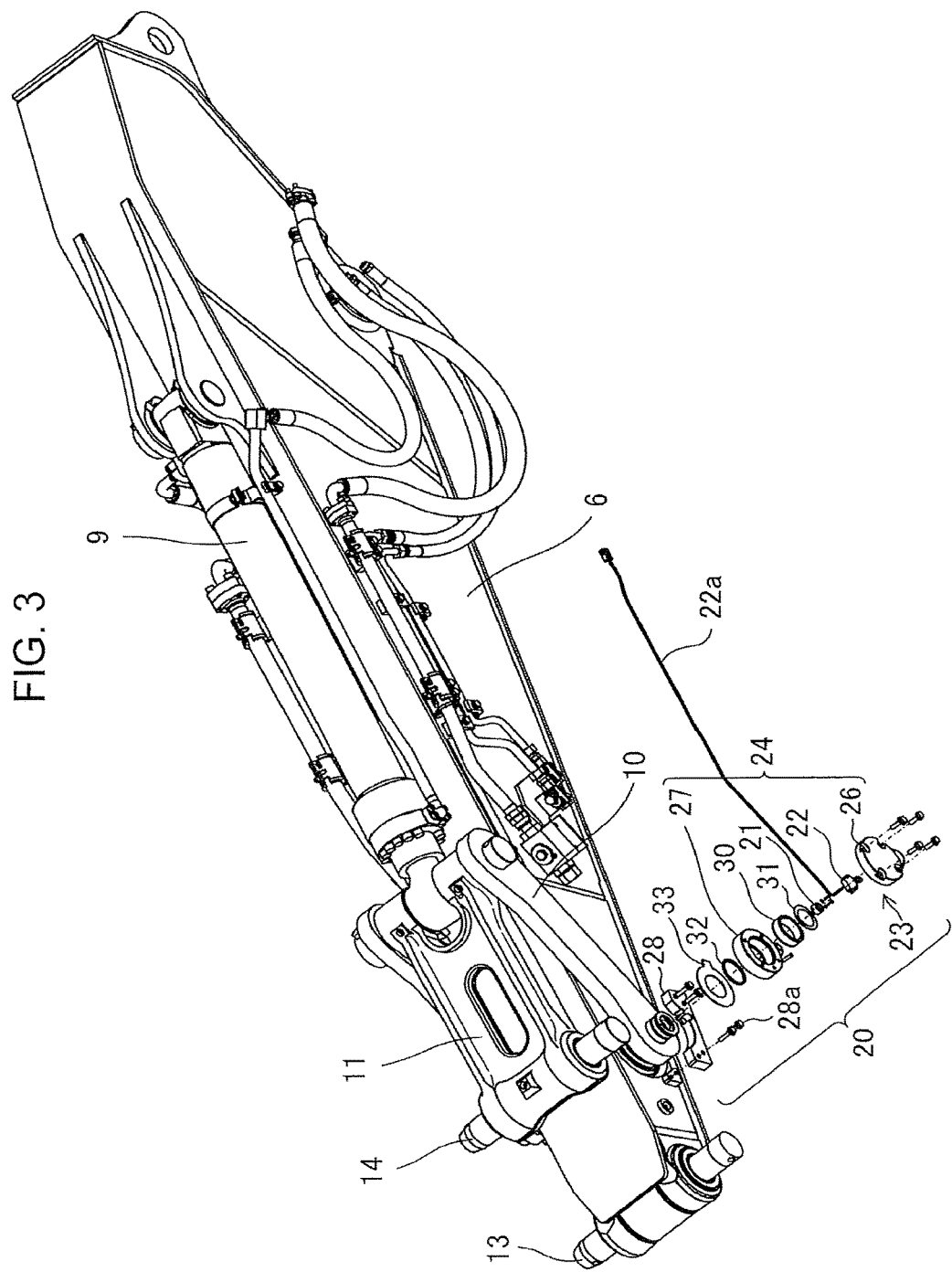
FIG. 3 is an exploded perspective view showing an arm as a first member of the hydraulic excavator.

In the present embodiment, the sensor mounting bracket 23 is disposed so as to surround the projecting end portion, namely, the outer end portion of the connection pin 12, the end portion projecting outwardly beyond a left side surface of the arm 6 as shown in FIG. 1 and FIG. 3. The sensor mounting bracket 23, alternatively, may be provided around the end portion of the connection pin 12, the end portion projecting from a right side surface of the arm 6. The sensor mounting bracket 23 has respective parts capable of making contact with an axial end surface 12a and an outer circumference of the connection pin 12, the contact allowing the sensor mounting bracket 23 to be prevented from coming off from the connection pin 12.

The sensor mounting bracket 23 integrally has a main guard portion 24 and a guard-member-side engagement portion 25.

The main guard portion 24 is disposed so as to surround the projecting end portion of the connection pin 12 all around the projecting end portion in the vicinity of the flange portion 12b of the connection pin 12. The main guard portion 24 has a cover portion 26 and a case portion 27 which are members separated from each other.

Figure 6:
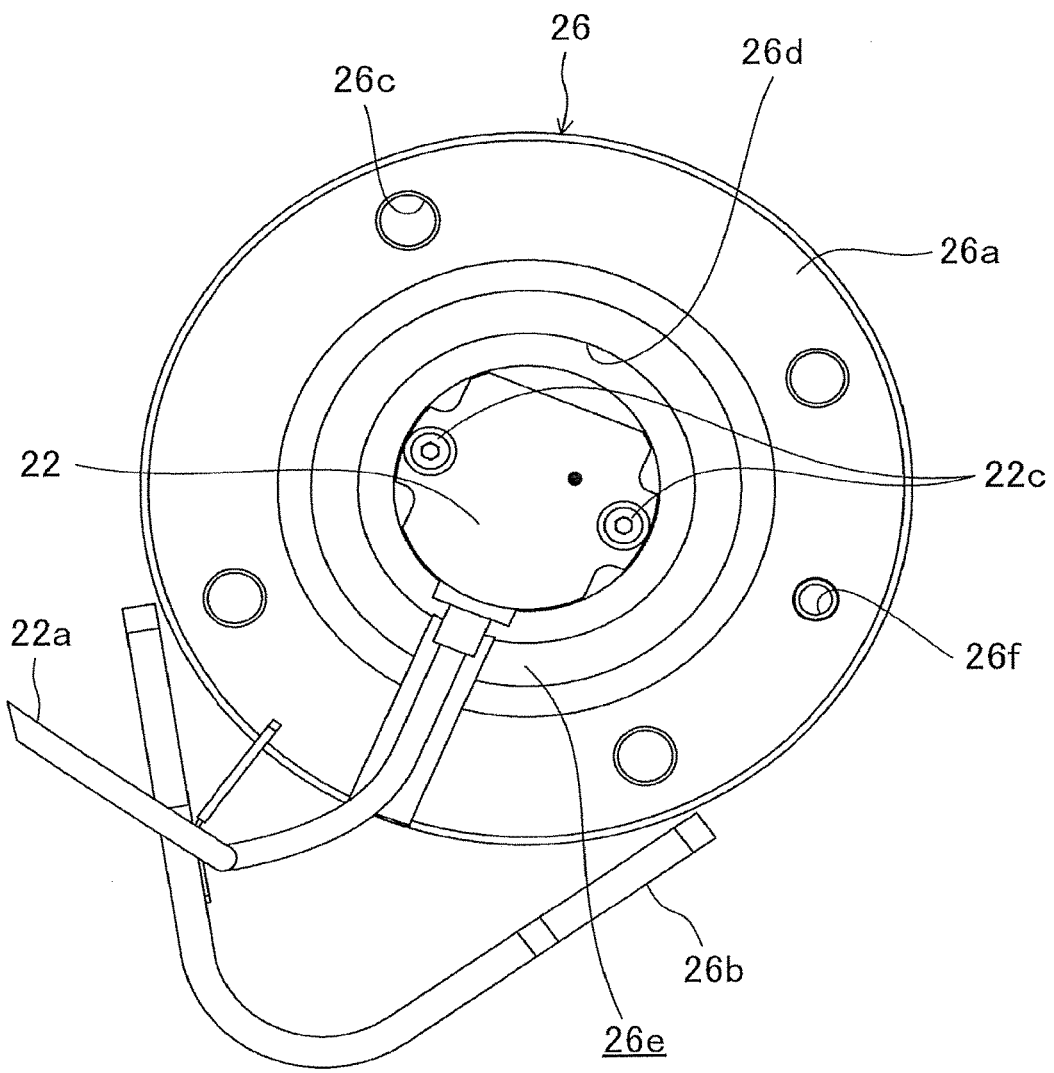
FIG. 6 is a side view showing an enlargement of a part of the angle detection device on a cover-portion side.
Figure 8:
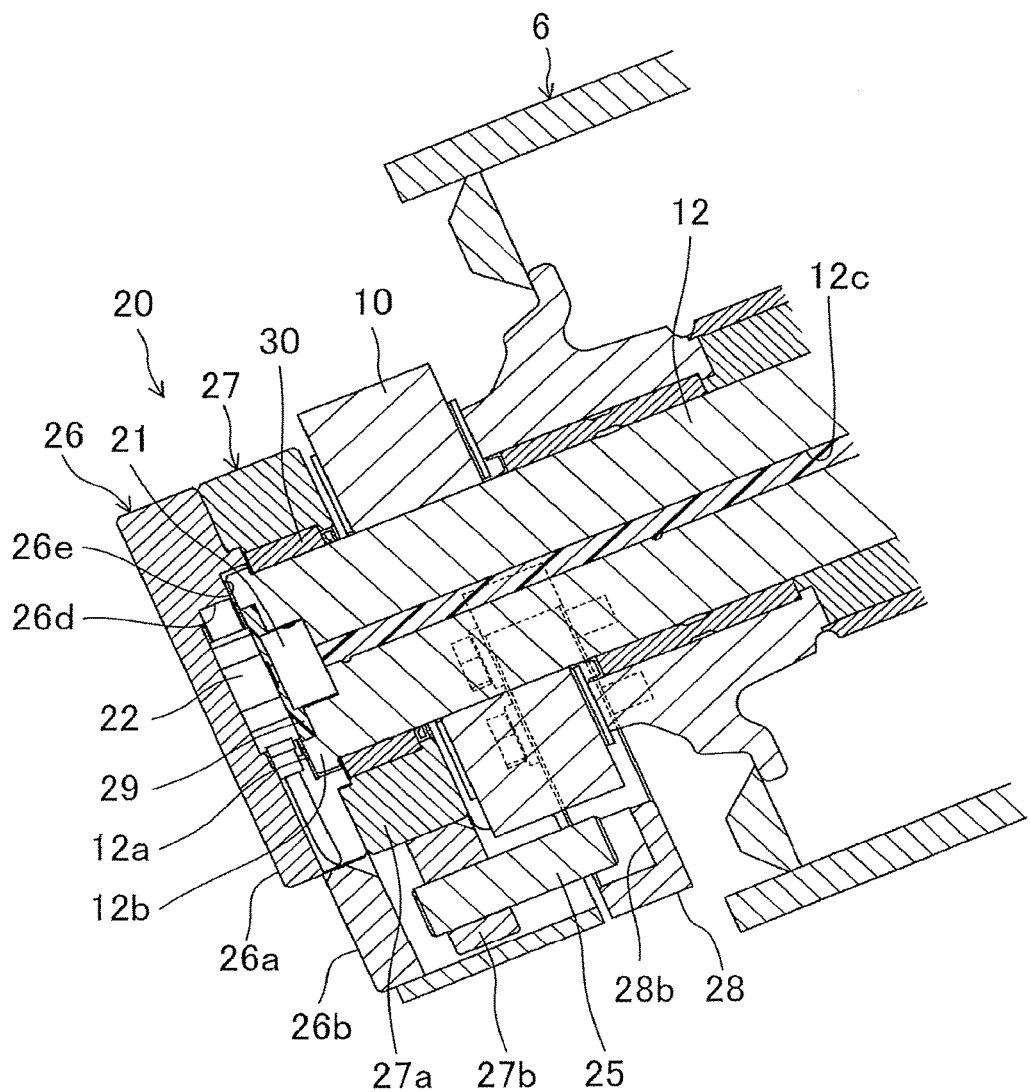
FIG. 8 is a sectional view taken along line VIII-VIII in FIG. 7.
Figure 9:
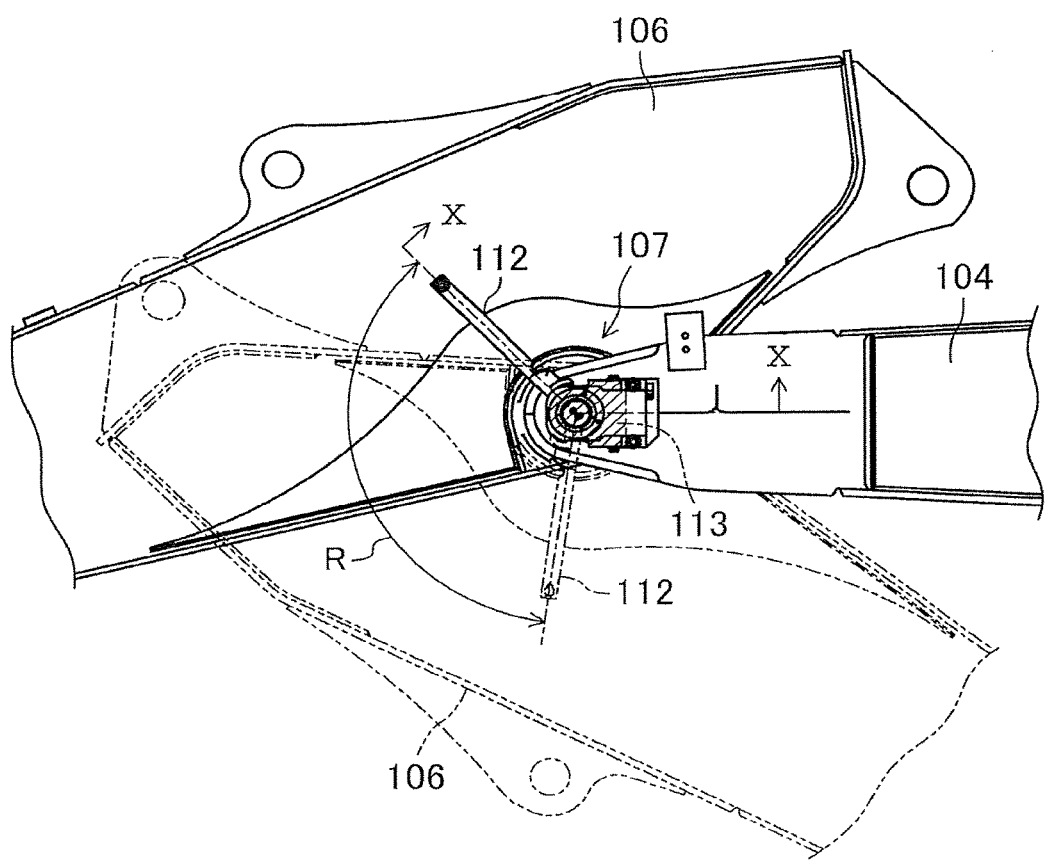
FIG. 9 is a side view showing an enlargement of a connection portion between a first member and a second member according to conventional art.

The cover portion 26 has a part allowing the angle sensor 22 to be fixed thereto and a part allowing the axial end surface 12a of the connection pin 12 to make contact therewith. Specifically, the cover portion 26, as also shown in FIG. 6 and FIG. 8, has a disc portion 26a and a bulbous portion 26b. The disc portion 26a is, for example, made of metal. The bulbous portion 26b bulges radially outwardly beyond the outer circumference edge of the disc portion 26a. The bulbous portion 26b is formed of, for example, a steel plate bent to having opposite ends, which are welded to the disc portion 26a.

The disc portion 26a is provided with a plurality of, for example, four, through holes 26c. The disc portion 26a has a surface opposed to the axial end surface 12a of the connection pin 12, namely, an inner side surface, in which a sensor housing recess 26d is formed; the angle sensor 22 is housed in the sensor housing recess 26d. The sensor housing recess 26d is defined by a circular bottom surface and a cylindrical inner circumferential surface, the bottom surface being an inner opposite surface which is opposed to an end surface of the projecting end portion of the connection pin 12.

The disc portion 26a includes a front periphery of the sensor housing recess 26d, the front periphery forming a flange-portion housing recess. For example, the flange-portion housing recess has an internal diameter slightly larger than the external diameter of the flange portion 12b and can be formed to be stepped by cutting the disc portion 26a. The flange-portion housing recess is defined by a circular bottom surface having a diameter slightly larger than an external diameter of the flange portion 12b and by a cylindrical inner circumferential surface continuous with the bottom surface, the bottom surface and the inner circumferential surface constituting a stepped flange contact portion 26e capable of making contact with the axial end surface 12a and the cylindrical outer circumferential surface of the flange portion 12b.

The angle sensor 22, being embedded in the sensor housing recess 26d, is fixed to the inner opposite surface of the cover portion 26 so as to be prevented from rotational movement relative to the cover portion 26, for example, through sensor fixing screws 22c. The cover portion 26 is formed with a positioning hole 26f. The positioning hole 26f is located, for example, between two through holes 26c selected from the plurality of through holes 26c.

As shown in FIG. 7 and FIG. 8, the case portion 27 has an annular case body 27a, a lug portion 27b protruding radially outwardly from the case body 27a, and a bush 30.

The guard-member-side engagement portion 25 is continuous with the lug portion 27b. The guard-member-side engagement portion 25 is a portion for restraining the entire main guard portion 24 including the cover portion 26 from rotational movement relative to the arm 6 as the first member. The guard-member-side engagement portion 25 according to the present embodiment is a projection extending along the axial direction of the connection pin 12 from the lug portion 27b toward the arm 6. The projection is shaped to a round bar in the present embodiment. The shape of the projection is, however, not limited thereto but permitted to be also a square-shape or a plate-shape. The bulbous portion 26b has a shape to cover the lug portion 27b and the guard-member-side engagement portion 25 to guard them.

As shown in FIG. 7, the case portion 27 is formed with a plurality of (four in FIG. 7) screw holes 27c which are opened in the outer surface (in the present embodiment, the left side surface) of the case portion 27. Between two of the screw holes 27c is formed a positioning pin 27d which projects toward the cover portion 26 beyond the outer surface. The positioning pin 27d has a shape capable of being inserted into the positioning hole 26f to thereby align the plurality of screw holes 27c to the plurality of through holes 26c in the cover portion 26, respectively. In this state, respective fastening bolts 26g are inserted into the through holes 26c and screwed into the screw holes 27c, thereby fastening the case portion 27 to the cover portion 26 through the fastening bolt 26g. The thus mutually fastened case portion 27 (specifically, the bush 30 of the case portion 27) and cover portion 26 (specifically, the stepped flange contact portion 26e of the cover portion 26) sandwich the flange portion 12b of the connection pin 12 in the axial direction as shown in FIG. 8.

The angle detection device 20 further includes grease 29 as shown in FIG. 8. The grease 29 fills a space left between the marker 21 and the angle sensor 22, which are disposed between the inner opposite surface of the cover portion 26 and the axial end surface 12a of the connection pin 12. The grease 29 may be additionally fed from the outside as necessary. For example, the connection pin 12 according to the present embodiment is formed with a grease feeding path 12c extending along a center axis of the connection pin 12 as shown in FIG. 8, allowing the grease 29 to be fed through the grease feeding path 12c to refill the space. The grease 29 provides, in addition to lubrication between the flange portion 12b and the case portion 27, an effect of preventing dirt or iron filings from entering the space to ensure accurate angle detection and an effect of excluding an influence of water to improve waterproofness of the angle sensor 22.

The first member according to the present embodiment includes, in addition to the arm 6, a fixing member 28 as shown in FIG. 1. The fixing member 28 is fixed to the arm 6 so as to move integrally with the arm 6, being formed with a rotation prevention recess 28b as a first-member-side engagement portion. Specifically, in the outer periphery of the connection pin 12 in the outer surface (the left side surface in the embodiment) of the arm 6, there is provided a pair of tapped blocks 16 in front and behind, to which the fixing member 28 is fixed through a plurality of bolts 28a. The fixing member 28 has a shape circularly notched to avoid interference with the idler link 10. In the edge of thus circularly notched part, the rotation prevention recess 28b is formed.

The rotation prevention recess 28b has a shape that receives fitting of the guard-member-side engagement portion 25 in the rotation prevention recess 28b along the axial direction of the connection pin 12. The thus mutually engaged rotation prevention recess 28b and the guard-member-side engagement portion 25 restrain the main guard portion 24 including the case portion 27 and the cover portion 26 from rotational movement relative to the arm 6 in the rotational-movement direction.

The fixing member 28 has a cable insertion recess 28c as shown in FIG. 7. The cable insertion recess 28c, which is formed in the vicinity of the rotation prevention recess 28b in the fixing member 28, has a shape allowing a cable 22a extending from the angle sensor 22 to pass through the cable insertion recess 28c. The cable 22a thus passed through the cable insertion recess 28c can be covered with a cable guard bracket 22b attached to the outer surface (left side surface) of the arm 6 as shown in FIG. 4 to be guarded.

As shown in FIG. 1, FIG. 3 and FIG. 8, the bush 30 has a cylindrical shape making close contact with the inner surface of the case body 27a. The bush 30 has an inner circumferential surface capable of slidable contact with the circumferentially entire outer circumferential surface of the projecting end portion of the connection pin 12. This enables a load applied to the case portion 27 to be reliably transmitted to the connection pin 12.

The angle detection device 20 has a mechanism which suppresses leakage of the grease 29. The mechanism includes, for example, a washer 31 disposed adjacent to the bush 30 at a position closer to the angle sensor 22 than the bush 30, a sealing member 32 made of rubber or the like and disposed adjacent to the bush 30 at a position closer to the arm 6 than the bush 30, and a dust cover member 33 formed of a steel plate or the like.

Next will be described the action of the angle detection device 20.

In the hydraulic excavator 1, the end attachment cylinder 9 extends and contracts to bring the idler link 10 into rotational movement in the rotational-movement direction around the center axis of the connection pin 12, during operation of the crushing device 8, involving rotational movement of the connection pin 12 and the marker fixed thereto integrally with the idler link 10 in the rotational-movement direction. On the other hand, the angle sensor 22 attached to the sensor mounting bracket 23 restrained from rotational movement relative to the arm 6 senses a rotational-movement angle of the marker 21 relative to the angle sensor 22, namely, an angle in the rotational-movement direction. The thus sensed rotational-movement angle, which corresponds to the rotational-movement angle of the idler link 10 relative to the arm 6, enables the working posture of the crushing device 8 to be grasped. The grasp of the working posture enables, in combination with control of the angle at which the boom 4 is raised and lowered, contact prevention control, i.e., control for preventing the crushing device 8 and the driving room 3a or the like from contact with each other, to be performed. This contact prevention control makes it possible to conduct working in a wider area while grasping the actual posture of the crushing device 8, than conventional contact prevention control of suppressing movement of the crushing device 8 under the assumption that the crushing device 8 would always take a working posture at which the crushing device 8 is most likely to come into contact with the driving room 3a or the like.

In the present embodiment, the marker 21 is fixed to the connection pin 12 which makes rotational movement integrally with the idler link 10 as the second member, while the angle sensor 22 is fixed to the sensor mounting bracket 23 restrained from rotational movement relative to the arm 6 as the first member, at a position where the angle sensor 22 is opposed to the marker 21 with a gap in the axial direction of the connection pin 12; this eliminates necessity for using a conventional lever which makes rotational movement with a large radius to sense a rotational-movement angle and further eliminates necessity for leaving a space corresponding to the rotational area of the lever. This enables the sensor mounting bracket 23 to be disposed so as to surround the projecting end portion of the connection pin 12 all around it to thereby reliably guard the angle sensor 22.

In the case where a load is applied to the sensor mounting bracket 23 in the axial direction of the connection pin 12 or in a direction vertical to the axial direction, the sensor mounting bracket 23 can make contact, in the axial direction, with the connection pin 12 having high strength, or can make radial contact with the outer circumferential surface of the connection pin 12, to thereby transmitted the load to the connection pin 12. This allows the connection pin 12 to effectively restrict the sensor mounting bracket 23 from deformation, thereby making it possible to ensure the guard of the angle sensor 22 and the marker 21 and to maintain the relative positional relationship therebetween. Moreover, the prevention of the sensor mounting bracket 23 as a guard member from coming off from the connection pin 12 allows a deviation in a positional relationship between the angle sensor 22 and the marker 21 to be prevented more reliably.

The sensor mounting bracket 23 according to the present embodiment, which is divided into the cover portion 26 and the case portion 27 to be capable of sandwiching the flange portion 12b of the connection pin 12 therebetween in the axial direction of the connection pin 12, can be more reliably restrained from relative displacement to the connection pin 12. This makes it possible to effectively restrain the distance between the angle sensor 22 and the marker 21 from being changed. This allows a load applied to the cover portion 26 to be reliably transmitted to the flange portion 12b and allows a deviation in position of the cover portion 26 relative to the connection pin 12 to be reliably prevented, against the load, thus keeping the distance between the angle sensor 22 and the marker 21 be constant. Besides, the ability of the sensor mounting bracket 23 to be divided into the cover portion 26 and the case portion 27 facilitates set-up, replacement and the like of the angle sensor 22 and the marker 21.

The guard-member-side engagement portion 25 projects from the lug portion 27b of the case portion 27 to engage with the rotation prevention recess 28b of the fixing member 28 fixed to the arm 6, thereby restraining the entire main guard portion 24 including the case portion 27 from rotational movement relative to the arm 6. This allows the angle sensor 22 to detect the rotational-movement angle of the idler link 10 more reliably.

In the present embodiment, the marker 21, to which no wire has to be connected, is fixed to the connection pin 12 which makes rotational movement together with the idler link 10 relatively to the arm 6, while the angle sensor 22, to which a wire has to be connected, is fixed to the arm 6 through the sensor mounting bracket 23 as a guard member; this facilitates wiring and protects the wire from damage. Moreover, the cable 22a can be covered with the cable guard bracket 22b while passing through the cable insertion recess 28c of the fixing member 28, thereby being reliably guarded.

In the present embodiment, the angle sensor 22 can be guarded even in a distal end portion with which dirt or pieces of metal is likely to come into contact, and, in addition, the rotational-movement angle of the end attachment can be reliably sensed; this makes it possible to reliably prevent the end attachment from contact with, for example, a driving room, to thereby enable the end attachment to be safely used in a range as wide as possible. The working machine according to the present embodiment is, thus, capable of reliably guarding the angle sensor 22 without hindering rotation of the idler link 10 relative to the arm 6.

The foregoing embodiment is inherently for illustrative purpose only and it is not to be construed as limiting the present invention, an application thereof and a range of the application. The present invention includes the following modes, for example.

Although the marker 21, in the embodiment, is fixed to the projecting end portion of the connection pin 12 while the angle sensor 22 is fixed to the cover portion 26 of the sensor mounting bracket 23 as a guard member, it is also possible to connect the angle sensor 22 to the connection pin 12 so as to make rotational movement integrally with the connection pin 12 and to fix the marker 21 to a guard member, i.e., a member restrained from rotational movement relative to the first member is regulated.

Although the first-member-side engagement portion according to the embodiment is the rotation prevention recess 28b which is a recessed part of the block-shaped fixing member 28, the first-member-side engagement portion according to the present invention may be configured by, for example, a U-shaped member having an inner surface defining a space which receives insertion of the guard-member-side engagement portion.

Although the angle sensor 22 according to the embodiment is a sensor which detects an angle position of the marker 21 by use of a magnetic field, the angle sensor according to the present invention may be other non-contact sensor, for example, an infrared sensor or an optical sensor. Alternatively, it is also possible that the combination of the marker and the angle sensor is constituted by a potentiometer including a wiper and a resistance plate. In either case, the angle sensor and the marker only has to be arranged such that one of the angle sensor and the marker forms a first detection element fixed to a guard member and the other of the angle sensor and the marker forms a second detection element fixed to a connection pin.

Although, in the present embodiment, the first member includes the arm 6 and the second member includes the idler link 10, it is also possible that the first member includes the idler link 10 and the second member includes the arm 6. For example, it is possible that the rotation prevention recess which receives the guard-member-side engagement portion 25 extending from the cover portion 26 as in the embodiment is formed in the idler link 10 and the connection pin 12 is connected to the arm 6 so as to make rotational movement integrally with the arm 6.

Although the working machine according to the embodiment is the hydraulic excavator 1, the working machine provided by the present invention is not limited to a hydraulic excavator. The present invention is widely applicable to working machines such as construction machinery and civil engineering machinery, which include a first member, a second member joined to the first member so as to be capable of rotational movement around a connection pin, and an angle detection device which detects a rotational-movement angle of the second member relative to the first member.

As described above, provided is a working machine including a first member, a second member coupled to the first member so as to be capable of rotational movement in a specific rotational-movement direction with respect to the first member, and an angle detection device including an angle sensor which detects a rotational-movement angle that the second member makes with the first member in the rotational-movement direction, the working machine being capable of reliably guarding the angle sensor without hindering the rotational movement.

The working machine includes: a first member; a second member; a connection pin interposed between the first member and the second member, the connection pin interconnecting the first member and the second member so as to allow the second member to make rotational movement relative to the first member in a rotational-movement direction around the connection pin; and an angle detection device which detects a rotational-movement angle as an angle that the second member makes with the first member in the rotational-movement direction. The connection pin is connected to the second member so as to make rotational movement integrally with the second member while being connected to the first member so as to be able to make rotational movement relative to the first member in the rotational-movement direction, the connection pin having a projecting end portion which projects beyond the first member and the second member in an axial direction of the connection pin. The angle detection device includes a marker, an angle sensor which detects a relative angle position of the marker to the angle sensor in the rotational-movement direction, and a guard member which guards the angle sensor, the marker and the angle sensor being arranged so as to detect an angle that the connection pin makes with the first member in the rotational-movement direction. The guard member has a main guard portion, which covers the angle sensor so as to surround the projecting end portion of the connection pin all around the projecting end portion, and a guard-member-side engagement portion joined with the main guard portion. The main guard portion has an inner opposite surface which is an inner surface opposed to an end surface of the projecting end portion of the connection pin, one of the angle sensor and the marker being a first detection element disposed on the inner opposite surface, the other of the angle sensor and the marker being a second detection element disposed on the end surface of the projecting end portion so as to be opposed to the first detection element with a gap in the axial direction. The first member has a first-member-side engagement portion engageable with the guard-member-side engagement portion, and the first-member-side engagement portion and the guard-member-side engagement portion engage with each other to restrain the main guard portion from relative rotational movement to the first member in the rotational-movement direction. The guard member includes respective parts capable of making contact with an axial end surface and a circumferential surface of the projecting end portion of the connection pin, the contact causing the guard member to be restrained from relative displacement to the projecting end portion.

In the working machine, one of the marker and the angle sensor is disposed, as the second detection element, at the connection pin which rotates integrally with the second member, and the other of the angle sensor and the marker is disposed, as the first detection element, at a position opposed to the second detection element, thereby sensing a relative rotational-movement angle of the second member to the first member in the rotational-movement direction. This eliminates necessity for using a conventional lever to sense the rotational-movement angle and leaving a space corresponding to the rotation range of the lever. This allows the guard member to be disposed so as to surround the projecting end portion of the connection pin all around it to thereby guard the angle sensor reliably. Furthermore, the guard member is able to make contact, in the axial direction and radially, with the connection pin having high strength, when receiving a load in the axial direction of the connection pin or in a direction vertical to the axial direction, to thereby transmit the load to the connection pin. This effectively suppresses deformation of the guard member and thereby ensures the guard of the angle sensor and the marker and suppresses a change in a positional relationship therebetween. Moreover, the guard member, which makes contact with the connection pin to be restrained from relative displacement to the connection pin, can stabilize the positional relationship between the angle sensor and the marker.

It is preferable that the connection pin has a flange portion which projects radially outwardly beyond other parts of the connection pin and the main guard portion has a cover portion which includes a part capable of making contact with the inner opposite surface and the axial end surface of the connection pin and a case portion which sandwiches the flange portion in association with the cover portion in the axial direction of the connection pin. The main guard portion capable of being thus divided into the cover portion and the case portion reliably sandwiches the flange portion of the connection pin in the axial direction of the connection pin to reliably prevent the guard member from coming off from the connection pin and to effectively suppress a change in the distance between the angle sensor and the marker. Besides, the thus divisible main guard portion facilitates set-up, replacement and the like of the angle sensor and the marker.

It is preferable that the flange portion has a cylindrical outer circumferential surface and the cover portion includes a flange-portion housing recess defined by a circular bottom surface capable of making contact with the flange portion in the axial direction and by a cylindrical inner circumferential surface capable of making radial contact with the outer circumferential surface of the flange portion. The cover portion including the flange-portion housing recess can reliably transmit a load applied to the cover portion to the flange portion of the connection pin and reliably prevent the position of the cover portion relative to the connection pin from deviation.

Preferably, the angle detection device further includes grease which fills a space left between the angle sensor and the marker. The grease provides, in addition to lubrication between the flange portion of the connection pin and the case portion, an effect of preventing dirt or iron filings from entering the space to realize accurate angle detection and an effect of improving waterproofness of the angle sensor by excluding an effect of water.

It is preferable that the guard-member-side engagement portion includes a projection which projects from the case portion and the first-member-side engagement portion includes a rotation prevention recess provided in the first member, the rotation prevention recess receiving fitting of the projection in the rotation prevention recess to engage with the projection to thereby restrain the guard member from relative rotational movement to the first member in the rotational-movement direction. Receiving the fitting of the projection, the rotation prevention recess can reliably restrain the case portion from relative rotational movement to the first member to thus make it possible to accurately detect the rotational-movement angle of the second member relative to the first member.

It is preferable that the marker is fixed to the end surface of the projecting end portion so as to make rotational movement in the rotational-movement direction integrally with the connection pin to form the second detection element, while the angle sensor is fixed to the inner opposite surface so as to be prevented from rotational movement relative to the cover portion to form the first detection element. Thus fixing the marker requiring no wire, as the second detection element, to the connection pin which makes rotational movement integrally with the second member and fixing the angle sensor requiring a wire, as the first detection element, to the guard member restrained from relative rotational movement to the first member facilitates wiring of the angle sensor and prevents the wire from be easily damaged.

If including the rotation prevention recess, the first member preferably includes a cable insertion recess located in the vicinity of the rotation prevention recess to allow a cable extending from the angle sensor to pass through the cable insertion recess. The cable insertion recess enables a cable extending from the angle sensor provided in the cover portion to be reliably guarded.

Preferably, the working machine further includes, for example, a lower travelling body, an upper slewing body capable of being slewed above the lower travelling body, and a boom rotatably coupled to the upper slewing body, wherein the first member includes an arm rotatably coupled to a distal end of the boom, and the second member includes an idler link interposed between the arm and an end attachment, the end attachment being attached to the idler link. In the working machine, the angle sensor can be effectively guarded even in the vicinity of the end attachment with which dirt or pieces of metal easily come into contact, and the rotational-movement angle of the end attachment relative to the arm can be reliably sensed. This makes it possible, for example, to safely use the end attachment in a range as wide as possible while reliably preventing the end attachment from contact with a driving room of the upper slewing body or the like.

This application is based on Japanese Patent application No. 2016-085104 filed in Japan Patent Office on Apr. 21, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A working machine comprising:
a first member;
a second member;
a connection pin interposed between the first member and the second member, the connection pin interconnecting the first member and the second member so as to allow the second member to make rotational movement relative to the first member in a rotational-movement direction around the connection pin; and
an angle detection device which detects a rotational-movement angle as an angle of the second member relative to the first member in the rotational-movement direction, wherein:
the connection pin is connected to the second member so as to make rotational movement integrally with the second member while being connected to the first member so as to be able to make rotational movement relative to the first member in the rotational-movement direction, the connection pin having a projecting end portion which projects beyond the first member and the second member in an axial direction of the connection pin;
the angle detection device includes a marker, an angle sensor which detects a relative angle position of the marker to the angle sensor in the rotational-movement direction, and a guard member which guards the angle sensor, the marker and the angle sensor being arranged so as to detect an angle that the connection pin makes with the first member in the rotational-movement direction, wherein the angle sensor is a non-contact sensor and wherein a relative positional relationship between the non-contact sensor and the marker is maintained;
the guard member has a main guard portion, which covers the angle sensor so as to surround the projecting end portion of the connection pin all around the projecting end portion, and a guard-member-side engagement portion joined with the main guard portion;
the main guard portion has an inner opposite surface which is an inner surface opposed to an end surface of the projecting end portion of the connection pin, one of the angle sensor and the marker being a first detection element disposed on the inner opposite surface, the other of the angle sensor and the marker being a second detection element disposed on the end surface of the projecting end portion so as to be opposed to the first detection element with a gap in the axial direction;
the first member has a first-member-side engagement portion engageable with the guard-member-side engagement portion and the first-member-side engagement portion and the guard-member-side engagement portion engage with each other to restrain the main guard portion from relative rotational movement to the first member in the rotational-movement direction; and
the guard member includes respective parts capable of making contact with an axial end surface and a circumferential surface of the projecting end portion of the connection pin, the contact causing the guard member to be restrained from relative displacement to the projecting end portion.

2. The working machine according to claim 1, wherein the connection pin has a flange portion which projects radially outwardly beyond other parts of the connection pin and the main guard portion has a cover portion which includes a part capable of making contact with the inner opposite surface and the axial end surface of the connection pin and a case portion which sandwiches the flange portion in association with the cover portion in the axial direction of the connection pin.

3. The working machine according to claim 2, wherein the flange portion has a cylindrical outer circumferential surface, and the cover portion includes a flange-portion housing recess defined by a circular bottom surface capable of making contact with the flange portion in the axial direction and by a cylindrical inner circumferential surface capable of making radial contact with the outer circumferential surface of the flange portion.

4. The working machine according to claim 2, wherein the angle detection device further includes grease which fills a space left between the angle sensor and the marker.

5. The working machine according to claim 1, further comprising a lower travelling body, an upper slewing body capable of being slewed above the lower travelling body, and a boom rotatably coupled to the upper slewing body, wherein the first member includes an arm rotatably coupled to a distal end of the boom, and the second member includes an idler link interposed between the aim and an end attachment, the end attachment being attached to the idler link.

6. A working machine comprising:
a first member;
a second member;
a connection pin interposed between the first member and the second member, the connection pin interconnecting the first member and the second member so as to allow the second member to make rotational movement relative to the first member in a rotational-movement direction around the connection pin; and
an angle detection device which detects a rotational-movement angle as an angle of the second member relative to the first member in the rotational-movement direction, wherein:
the connection pin is connected to the second member so as to make rotational movement integrally with the second member while being connected to the first member so as to be able to make rotational movement relative to the first member in the rotational-movement direction, the connection pin having a projecting end portion which projects beyond the first member and the second member in an axial direction of the connection pin;
the angle detection device includes a marker, an angle sensor which detects a relative angle position of the marker to the angle sensor in the rotational-movement direction, and a guard member which guards the angle sensor, the marker and the angle sensor being arranged so as to detect an angle that the connection pin makes with the first member in the rotational-movement direction;
the guard member has a main guard portion, which covers the angle sensor so as to surround the projecting end portion of the connection pin all around the projecting end portion, and a guard-member-side engagement portion joined with the main guard portion;
the main guard portion has an inner opposite surface which is an inner surface opposed to an end surface of the projecting end portion of the connection pin, one of the angle sensor and the marker being a first detection element disposed on the inner opposite surface, the other of the angle sensor and the marker being a second detection element disposed on the end surface of the projecting end portion so as to be opposed to the first detection element with a gap in the axial direction;
the first member has a first-member-side engagement portion engageable with the guard-member-side engagement portion and the first-member-side engagement portion and the guard-member-side engagement portion engage with each other to restrain the main guard portion from relative rotational movement to the first member in the rotational-movement direction; and
the guard member includes respective parts capable of making contact with an axial end surface and a circumferential surface of the projecting end portion of the connection pin, the contact causing the guard member to be restrained from relative displacement to the projecting end portion,
wherein the connection pin has a flange portion which projects radially outwardly beyond other parts of the connection pin and the main guard portion has a cover portion which includes a part capable of making contact with the inner opposite surface and the axial end surface of the connection pin and a case portion which sandwiches the flange portion in association with the cover portion in the axial direction of the connection pin, and
wherein the guard-member-side engagement portion includes a projection which projects from the case portion, and the first-member-side engagement portion includes a rotation prevention recess provided in the first member, the rotation prevention recess receiving fitting of the projection in the rotation prevention recess to engage with the projection to thereby restrain the guard member from relative rotational movement to the first member in the rotational-movement direction.

7. The working machine according to claim 6, wherein the first member has a cable insertion recess located in a vicinity of the rotation prevention recess to allow a cable extending from the angle sensor to pass through the cable insertion recess.

8. A working machine comprising:
a first member;
a second member;
a connection pin interposed between the first member and the second member, the connection pin interconnecting the first member and the second member so as to allow the second member to make rotational movement relative to the first member in a rotational-movement direction around the connection pin; and
an angle detection device which detects a rotational-movement angle as an angle of the second member relative to the first member in the rotational-movement direction, wherein:
the connection pin is connected to the second member so as to make rotational movement integrally with the second member while being connected to the first member so as to be able to make rotational movement relative to the first member in the rotational-movement direction, the connection pin having a projecting end portion which projects beyond the first member and the second member in an axial direction of the connection pin;

the angle detection device includes a marker, an angle sensor which detects a relative angle position of the marker to the angle sensor in the rotational-movement direction, and a guard member which guards the angle sensor, the marker and the angle sensor being arranged so as to detect an angle that the connection pin makes with the first member in the rotational-movement direction;

the guard member has a main guard portion, which covers the angle sensor so as to surround the projecting end portion of the connection pin all around the projecting end portion, and a guard-member-side engagement portion joined with the main guard portion;

the main guard portion has an inner opposite surface which is an inner surface opposed to an end surface of the projecting end portion of the connection pin, one of the angle sensor and the marker being a first detection element disposed on the inner opposite surface, the other of the angle sensor and the marker being a second detection element disposed on the end surface of the projecting end portion so as to be opposed to the first detection element with a gap in the axial direction;

the first member has a first-member-side engagement portion engageable with the guard-member-side engagement portion and the first-member-side engagement portion and the guard-member-side engagement portion engage with each other to restrain the main guard portion from relative rotational movement to the first member in the rotational-movement direction; and the guard member includes respective parts capable of making contact with an axial end surface and a circumferential surface of the projecting end portion of the connection pin, the contact causing the guard member to be restrained from relative displacement to the projecting end portion, wherein the connection pin has a flange portion which projects radially outwardly beyond other parts of the connection pin and the main guard portion has a cover portion which includes a part capable of making contact with the inner opposite surface and the axial end surface of the connection pin and a case portion which sandwiches the flange portion in association with the cover portion in the axial direction of the connection pin, and wherein the marker is fixed to the end surface of the projecting end portion so as to make rotational movement in the rotational-movement direction integrally with the connection pin to form the second detection element, and the angle sensor is fixed to the inner opposite surface so as to be prevented from rotational movement relative to the cover portion to form the first detection element.

* * * * *